United States Patent [19]

Babin

[11] Patent Number: 5,405,258
[45] Date of Patent: Apr. 11, 1995

[54] INJECTION MOLDING TORPEDO WITH THERMOCOUPLE BORE

[75] Inventor: Denis L. Babin, Action, Canada

[73] Assignee: Mold-Masters Limited, Georgetown, Canada

[21] Appl. No.: 323,588

[22] Filed: Oct. 17, 1994

Related U.S. Application Data

[63] Continuation of Ser. No. 47,927, Apr. 19, 1993, abandoned.

[30] Foreign Application Priority Data

Mar. 10, 1993 [CA] Canada ................................ 2091409

[51] Int. Cl.$^6$ .............................................. B29C 45/20
[52] U.S. Cl. .................................. 425/549; 264/328.15
[58] Field of Search ............................ 425/549, 568; 264/328.15

[56] References Cited

U.S. PATENT DOCUMENTS

| | | | |
|---|---|---|---|
| 4,266,723 | 5/1981 | Osuna-Diaz | 425/549 |
| 4,450,999 | 5/1984 | Gellert | 425/549 |
| 4,820,147 | 4/1989 | Gellert | 425/549 |
| 4,875,848 | 10/1989 | Gellert | 425/549 |
| 4,913,912 | 4/1990 | Leverenz | 425/549 |
| 5,028,227 | 7/1991 | Gellert et al. | 425/549 |
| 5,049,062 | 9/1991 | Gellert | 425/549 |
| 5,206,040 | 4/1993 | Gellert | 425/549 |

OTHER PUBLICATIONS

Dario Vetter and Hakim Belhadjhamida, Controlling the Heat in Hot Runners, May 1994, pp. 29, 30.

*Primary Examiner*—Tim Heitbrink
*Attorney, Agent, or Firm*—Dalesman & Company

[57] ABSTRACT

Injection molding apparatus for hot tip gating wherein a torpedo is screwed into a threaded seat in the forward end of a nozzle. The torpedo has an elongated shaft with a pointed tip mounted centrally in an outer collar by a pair of spiral blades which impart a swirling motion to the melt flowing to the gate. The temperature of the melt in the gate varies according to a continuous thermodynamic cycle in the torpedo. A thermocouple bore extends radially inward through the outer collar and one of the spiral blades to a conductive inner portion of the central shaft of the torpedo. The thermocouple bore is positioned whereby a thermocouple element extends radially outward from it into an insulative air space between the forward end of the nozzle and the mold. The thermocouple element has a substantially 90 degree rearward bend a predetermined distance from its inner end. The bend abuts against a tapered portion of the inner surface of the well in which the nozzle is seated to securely retain the thermocouple element against the inner end of the thermocouple bore. This accurate location and reliable retention of the thermocouple element in place provides the accurate monitoring of the melt temperature necessary for its control throughout the thermodynamic cycle.

6 Claims, 3 Drawing Sheets

INJECTION MOLDING TORPEDO WITH THERMOCOUPLE BORE

This application is a continuation of application Ser. No. 08/047,927, filed on Apr. 19, 1993, now abandoned.

BACKGROUND OF THE INVENTION

Both heated nozzles and probes are used to provide hot tip gating for injection molding. The difference between a nozzle and a probe is that the melt flows through a nozzle but around a probe. The increasing demand for more and more highly temperature sensitive materials has made it even more critical to monitor melt temperature as accurately as possible. U.S. Pat. No. 4,820,147 to Gellert which issued Apr. 11, 1989 relates to heated probes and shows inserting a thermocouple wire radially into one of the probe locating pins to monitor the melt temperature. More recently, Mold-Masters Limited Canadian Patent Application Serial Number 2,059,060-0 filed Jan. 20, 1992 entitled "Injection Molding Probe with Coaxial Thermocouple Sleeve and Heating Element" shows the thermocouple wire extending centrally in the probe. Thus the thermocouple is centrally located in the melt flow where heating and cooling is uniform on all sides.

However, in injection molding with nozzles where the melt flows through a central melt bore it previously was necessary to monitor the temperature at one side of the melt bore which has the disadvantage that it is not as accurate as monitoring it centrally in the melt flow. Injection molding nozzles having a torpedo with an elongated central shaft extending in alignment with a gate to provide hot tip gating are well known in the art. An early example in which the collar of the torpedo is seated in the mold to form a seal is shown in U.S. Pat. No. 4,450,999 to Gellert which issued May 29, 1984. An example in which the torpedo is retained in place in the nozzle by a separate gate insert is seen in the U.S. Pat. No. 5,028,227 to Gellert et al. which issued Jul. 2, 1991. While torpedoes have been successful for conducting heat to the gate area, they previously have also had the disadvantage that the operating temperature could only be monitored by a thermocouple located in the nozzle body on one side of the torpedo as seen in U.S. Pat. No. 5,028,227 mentioned above. Mold-Masters Limited Canadian Patent Application Serial Number 2,078,890-9 filed Sep. 22, 1992 entitled "Injection Molding Nozzle with Thermocouple Receiving Torpedo" does show a torpedo with a thermocouple positioned in the melt flow. However, it has the disadvantage that the radial thermocouple bore must extend through both the nozzle and the torpedo. Also, it is very important that the thermocouple element is accurately position and securely retained against the inner end of the radial bore and the only provision for this is a wire wrapped around the nozzle.

U.S. Pat. No. 4,875,848 to Gellert which issued Oct. 24, 1989, shows a nozzle with a threaded gate insert having a thermocouple bore extending inwardly through its hexagonal surface. However, the thermocouple element was only retained in place by friction which has not been found to be satisfactory.

SUMMARY OF THE INVENTION

Accordingly, it is an object of the present invention to at least partially overcome the disadvantages of the prior art by providing injection molding apparatus to receive a thermocouple element in a radial bore in the torpedo and securely retain the thermocouple element against the inner end of the thermocouple bore in the central shaft of the torpedo.

To this end, in one of its aspects, the invention provides hot tip gated injection molding apparatus comprising a heated nozzle and a torpedo to convey melt to a gate, the nozzle having an outer surface, a rear end, a forward end, and a melt bore extending longitudinally therethrough from the rear end to the forward end, the melt bore having an enlarged portion extending to the forward end to form a seat, the nozzle to be seated in a well having an inner surface in a mold with an insulative air space extending between the outer surface of the nozzle and the inner surface of the well in the mold, the torpedo having an outer collar with a central opening therethrough, an elongated shaft with a forward tip extending centrally through the central opening, and at least one blade extending between the central shaft and the outer collar, the outer collar having a cylindrical rear portion and a cylindrical forward portion, the cylindrical rear portion of the outer collar being removably received in the seat around the melt bore and the cylindrical forward portion of the outer collar being received in a circular opening in the mold, whereby the outer collar bridges the insulative air space extending between the nozzle and the mold, the central opening through the outer collar aligns with the melt bore through the nozzle and the forward tip of the central shaft of the torpedo extends in alignment with the gate, having the improvement wherein the torpedo has a bore extending radially inward through the collar and the blade to an inner end in the Central shaft to receive a thermocouple element having an inner end to monitor the operating temperature, the radial bore being positioned whereby the thermocouple element extends radially outward therefrom into the insulative air space between the forward end of the nozzle and the mold, the thermocouple element extending radially outward a predetermined distance from the inner end of the thermocouple element to a substantially 90 degree rearward bend, the bend abutting against a tapered portion of the inner surface of the well to securely retain the thermocouple element in the radial bore with the inner end of the thermocouple element in contact against the inner end of the radial bore.

Further objects and advantages of the invention will appear from the following description taken together with the accompanying drawings.

DETAILED DESCRIPTION OF THE INVENTION

Figure 1:
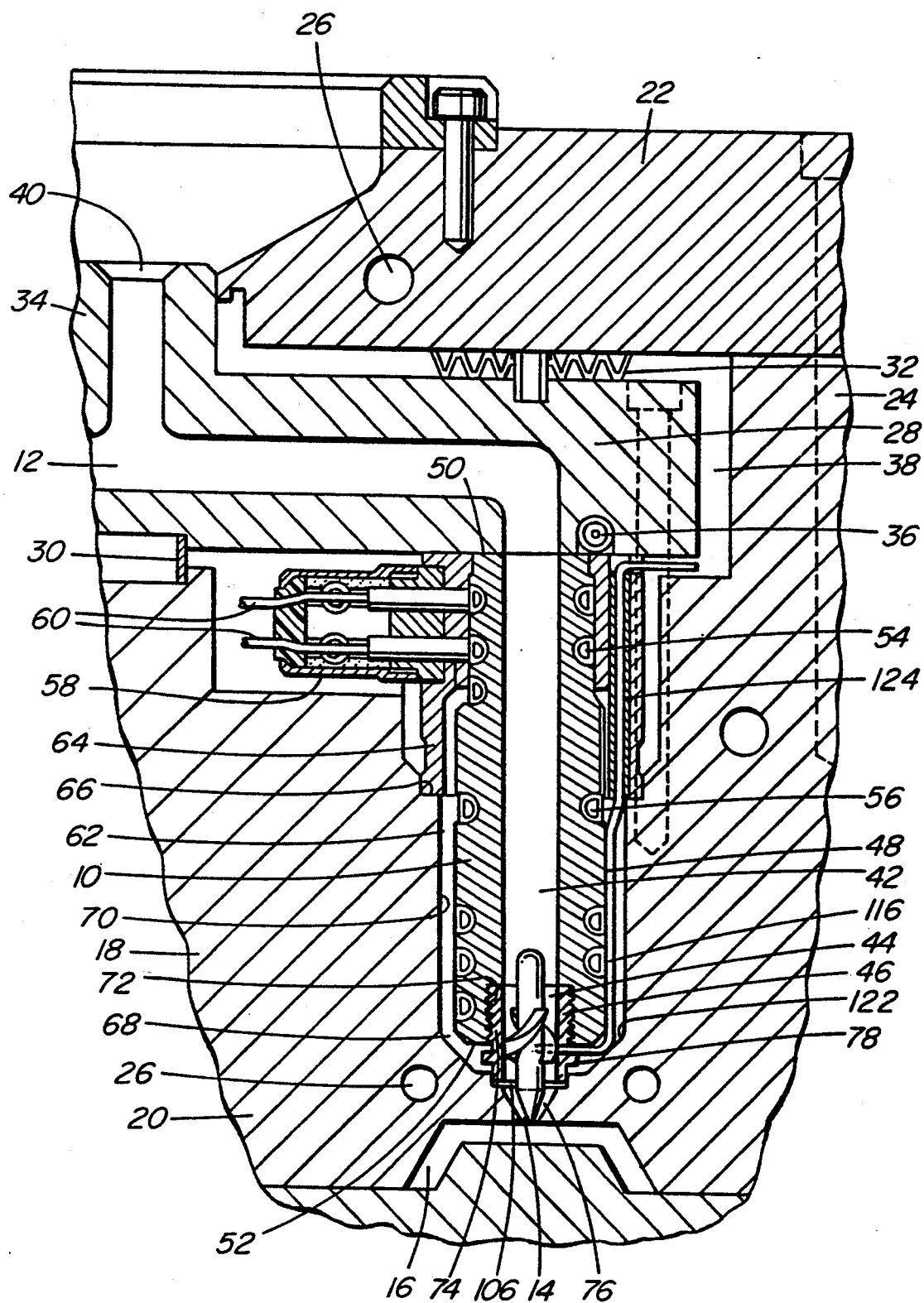
FIG. 1 is a sectional view of a portion of a multi-cavity injection molding system showing apparatus according to one embodiment of the invention.

Reference is first made to FIG. 1 which shows a portion of a multi-cavity injection molding system having several steel nozzles 10 to convey pressurized plastic melt through a melt passage 12 to respective gates 14 leading to different cavities 16 in the mold 18. In this particular configuration, the mold includes a cavity plate 20 and a back plate 22 which are removably secured together by bolts 24. The mold 18 is cooled by pumping cooling water through cooling conduits 26 extending in the cavity plate 20 and the back plate 22. An electrically heated steel melt distribution manifold 28 is mounted between the cavity plate 20 and back plate 22 by a central locating ring 30 and insulative and resilient spacer members 32. The melt distribution manifold 28 has a cylindrical inlet portion 34 and is heated by an integral electrical heating element 36. An insulative air space 38 is provided between the heated manifold 28 and the surrounding cooled cavity plate 20 and back plate 22. The melt passage 12 extends from a common inlet 40 in the inlet portion 34 of the manifold 28 and branches outward in the manifold 28 to each nozzle 10 where it extends through a central melt bore 42 and then through an aligned central opening 44 in a torpedo 46 to one of the gates 14.

Each nozzle 10 has an outer surface 48, a rear end 50, and a forward end 52. The nozzle 10 is heated by an integral electrical heating element 54 which has a spiral portion 56 extending around the melt bore 42 and an external terminal 58 to which electrical leads 60 from a power source are connected. The nozzle 10 is seated in a well 62 in the cavity plate 20 with a cylindrical locating flange 64 extending forwardly to a circular locating shoulder 66 in the well 62. Thus, an insulative air space 68 is provided between the inner surface 70 of the well 62 and the outer surface 48 of the nozzle 10 to provide thermal separation between the heated nozzle 10 and the surrounding cooled mold 16. The melt bore 42 has an enlarged portion with a threaded inner surface 72 to form a threaded seat 74 at its forward end 52. In this embodiment, the well 62 has a smaller central portion 76 which extends forwardly past the air space 68 and tapers inwardly to the gate 14. A small circular seat 78 extends in the mold 16 around the central portion 76 of the well 62.

Figure 2:
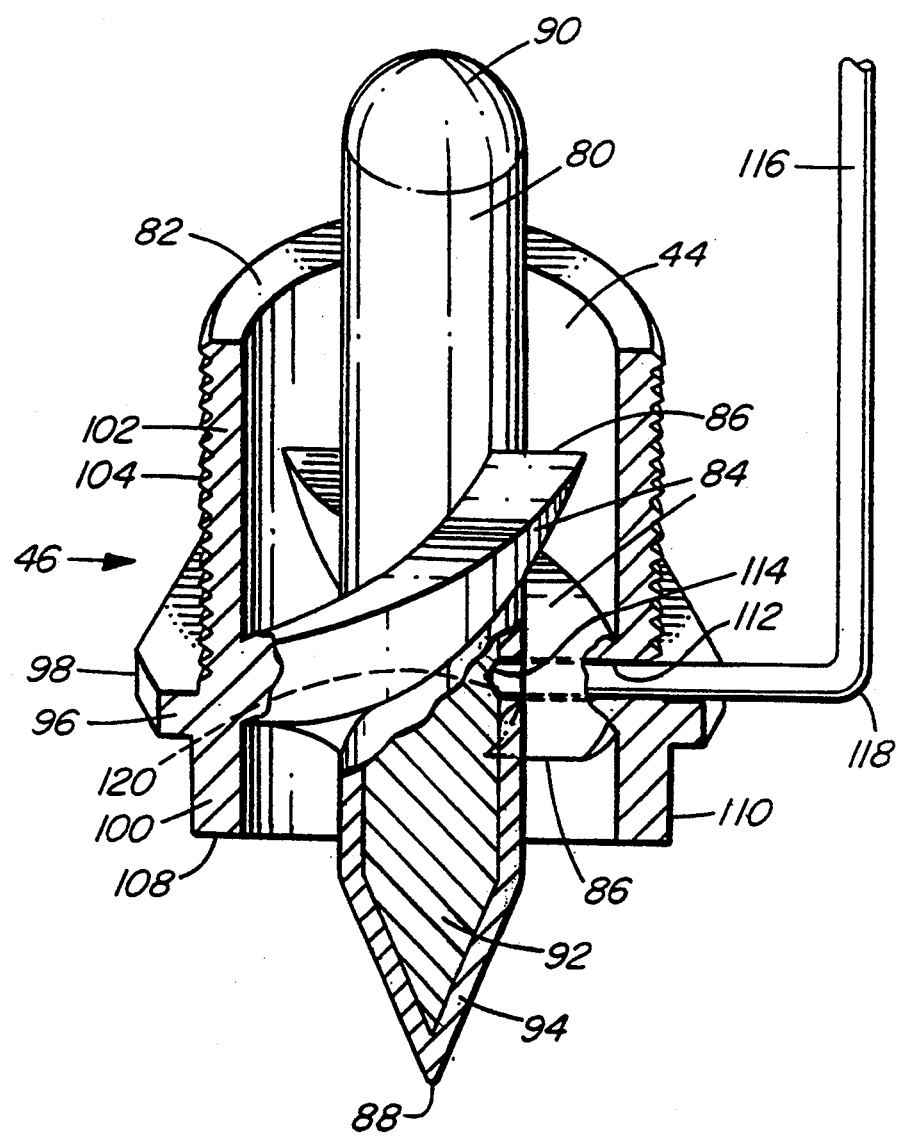
FIG. 2 is a cut-away isometric view of the torpedo and thermocouple element seen in FIG. 1.

Also referring to FIG. 2, the torpedo 46 has an elongated central shaft 80 extending longitudinally in the central opening 44 extending through an outer collar 82. In this embodiment, the central shaft 80 is connected to the outer collar 82 by a pair of spiral blades 84 with sharp rear and forward ends 86. The central shaft 80 has a pointed forward tip 88 which extends forwardly past the outer collar 82, and a smoothly rounded rear end 90 which extends rearwardly past the outer collar 82. The central shaft 80 has an inner portion 92 surrounded by a thin outer portion 94. The inner portion 92 is made of a highly thermally conductive material such as silver or copper, and the outer portion 94 is made of an abrasion and corrosion resistant material such as high speed steel to withstand wear from the pressurized melt flowing around it, particularly in the area of the gate 14.

The outer collar 82 of the torpedo 46 has an intermediate portion 96 with a nut-like outer surface 98 extending between a cylindrical forward portion 100 and a cylindrical rear portion 102 with a threaded outer surface 104. The rear portion 102 is screwed into the seat 74 at the forward end 52 of the nozzle 10, and the nozzle 10 is received in the well 62 with the forward portion 100 of the collar 82 seated in the seat 78 in the mold 16. Screwing the torpedo 46 into the nozzle 10 has the advantage that it is secured in place with a small space 106 provided adjacent the forward end 108 of the outer collar 82 to avoid damage to the mold 18. Also, it is easily removed by applying a wrench to the hexagonal outer surface 98 of the intermediate portion 96 of the outer collar 82. Of course, the intermediate portion 96 can have a different shape to receive another suitable tool for removal. Thus, the outer collar 82 of the torpedo 46 bridges the insulative air space 68 extending between the forward end 52 of the nozzle 10 and the mold 18 and prevents pressurized melt escaping into the air space 68. A seal is provided between the outer surface 110 of the forward portion 100 of the outer collar 82 and the surrounding seat 78. In this position, the central opening 44 through the outer collar 82 of the torpedo 46 is aligned with the melt bore 42 through the nozzle 10, and the pointed forward tip 88 of the central shaft 80 of the torpedo 46 is aligned with the gate 14. While the pointed tip 88 usually extends into the gate 14 itself which is also tapered, its precise location is determined by the thermal requirements of the particular application.

The torpedo 46 has a thermocouple bore 112 extending radially inward through the outer collar 82 and one of the spiral blades 84 to an inner end 114 in the conductive inner portion 92 of the central shaft 80 to receive a thermocouple element 114. As can be seen, the radial bore 112 is positioned to extend through the outer collar 82 of the torpedo 46 at or near the intermediate portion 96 so the thermocouple element 116 extends radially outward therefrom into the insulative air space 68 between the forward end 52 of the nozzle 10 and the cavity plate 20. The thermocouple element 116 has a substantially 90 degree rearward bend 118 a predetermined distance from its inner end 120. When the nozzle 10 and torpedo 46 are seated in place in the well 62, the bend 118 abuts against a tapered portion 122 of the inner surface 70 of the well 62 to securely retain the thermocouple element 116 in the radial bore 112 with the inner end 120 of the thermocouple element 116 in contact against the inner end 114 of the radial bore 112 in the central shaft 80 of the torpedo 46. The thermocouples element 116 has a thermocouple near its inner end 120 and precise location and reliable retention of the thermocouple element 116 with its inner end 120 against the highly conductive inner portion 92 of the central shaft 80 of the torpedo 46 is critical to accurately monitor the operating temperature during the thermodynamic cycle described below. The thermocouple element 116 extends rearwardly through the air space 68 and out through a hollow thermocouple tube 124. Thus, the thermocouple element 116 is easily removable, and in the event of leakage of melt into the air space 68, it will freeze off around the thermocouple element 116 in the thermocouple tube 124 to prevent leakage into the rest of the system.

In use, the injection molding system is assembled as shown in FIG. 1. While only a single cavity 16 has been shown for ease of illustration, it will be appreciated that the melt distribution manifold 28 normally has many more melt passage branches extending to numerous cavities 16 depending on the application. Electrical power is applied to the heating element 36 in the manifold 28 and to the heating elements 54 in the nozzles 10 to heat them to a predetermined operating temperature. Heat from the heating element 54 in each nozzle 10 is conducted forwardly through the torpedo 46 to the pointed tip 88 extending into the respective gate 14. Pressurized melt from a molding machine (not shown) is then injected into the melt passage 12 through the common inlet 40 according to a predetermined cycle in a conventional manner. The pressurized melt flows through the melt bore 42 of each nozzle 10, between the spiral blades 84 of the aligned torpedo 46, and through the gate 14 to fill the cavity 16. The flow between the fixed spiral blades 84 imparts a swirling motion to the melt. This swirling motion is accelerated as the melt approaches the small gate 14 and results in the melt flowing outward in the cavity 16 near the gate 14 with a curving motion. This avoids unidirectional molecular orientation of the melt, at least adjacent the gate, and provides a stronger product in the gate area. After the cavities 16 are filled, injection pressure is held momentarily to pack and then released. After a short cooling period, the mold is opened to eject the molded products. After ejection, the mold is closed and injection pressure is reapplied to refill the cavities 16. This cycle is continuously repeated with a frequency dependent on the size and shape of the cavities 16 and the type of material being molded. During the injection cycle there also is a continuous thermodynamic cycle in each torpedo 46. During injection, the torpedo 46 conducts excess heat which is generated by friction of the melt flowing through the constricted area of the gate 14 rearwardly to avoid stringing and drooling of the melt when the mold opens for ejection. After the melt has stopped flowing, solidification in the gate is enhanced by the removal of excess friction heat rearwardly through the torpedo 46. In some applications, the heating elements 54 are used to provide heat to control the operating temperature during the thermal cycle. In other applications, the transfer of heat produced in the melt by the screw barrel of the injection machine and by shear as it is forced through the torpedo 46 and the constricted gate 14 is sufficient to control the temperature of the melt in the gate 14 according to the thermodynamic cycle. Control of the melt viscosity during injection can also be provided by varying the velocity of melt flow. In order to control the operating temperature during the injection cycle, it is necessary to accurately monitor it continuously. This is provided by the accurate location and reliable retention of the thermocouple element 116 in the radial bore 112 with the inner end 120 of the thermocouple element 116 in contact against the inner end 114 of the radial bore 112 according to the invention.

Figure 3:
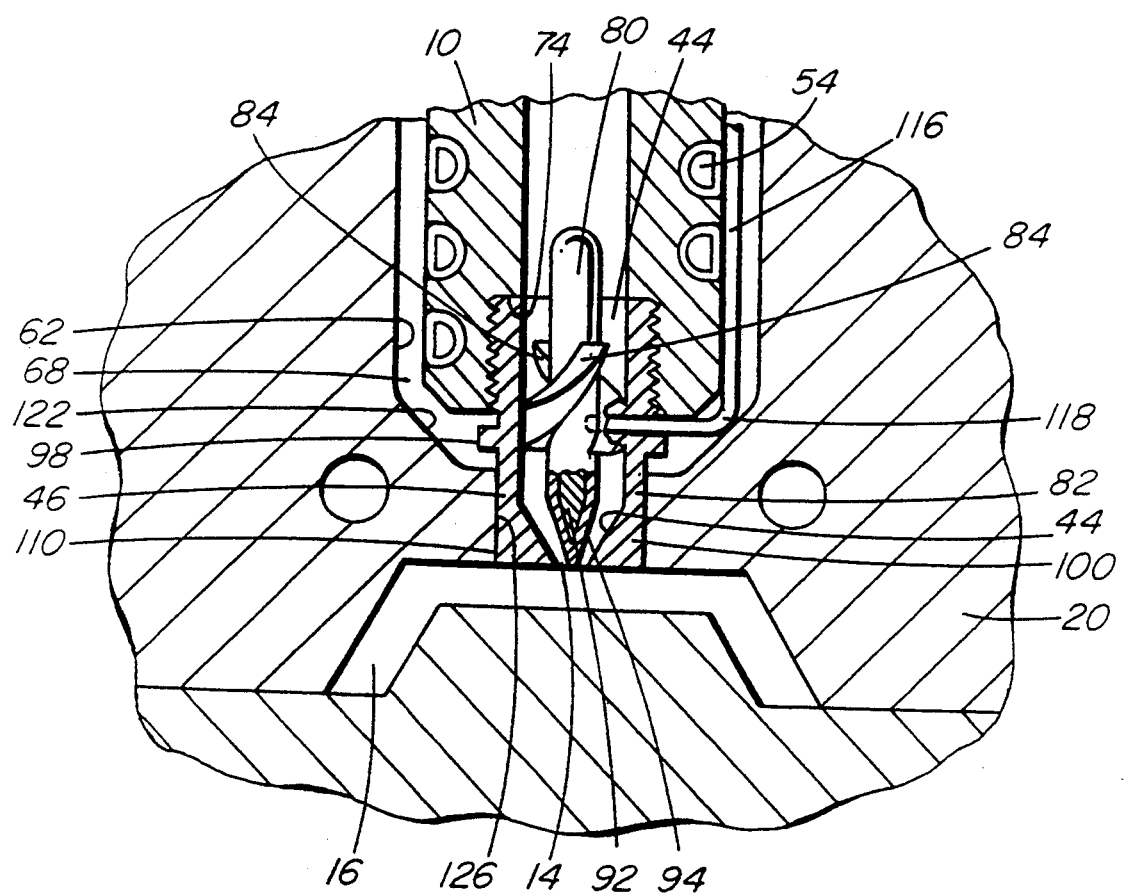
FIG. 3 is a partial sectional view showing a torpedo according to another embodiment of the invention.

Reference is now made to FIG. 3 to describe another embodiment of the invention. As many of the elements are the same as those described above, common elements are described and illustrated using the same reference numerals. In this embodiment, an opening 126 extends centrally through the cavity plate 20 from the well 62 to the cavity 16. The forward portion 100 of the outer collar 82 of the torpedo 46 extends through the central opening 126 to the cavity 16. The outer surface 110 of the forward portion 100 of the outer collar 82 fits in the central opening 126 to prevent melt leakage between them. The central opening 44 through the outer collar 82 of the torpedo 46 tapers inwardly in the forward portion 100 to form the gate 14 leading to the cavity 16.

While the description of the injection molding apparatus according to the invention has been given with respect to preferred embodiments, it will be evident that various other modifications are possible without departing from the scope of the invention as understood by those skilled in the art and as defined in the following claims.

The embodiments of the invention in which an exclusive property or privilege is claimed are defined as follows:

1. In a hot tip gated injection molding apparatus comprising a heated nozzle and a torpedo to convey melt to a gate, the nozzle having an outer surface, a rear end, a forward end, and a melt bore extending longitudinally therethrough from the rear end to the forward end, the melt bore having an enlarged portion extending to the forward end to form a seat, the nozzle to be seated in a well having an inner surface in a mold with an insulative air space extending between the outer surface of the nozzle and the inner surface of the well in the mold, the torpedo having an outer collar with a central opening therethrough, an elongated shaft with a forward tip extending centrally through the central opening, and at least one blade extending between the central shaft and the outer collar, the outer collar having a cylindrical rear portion and a cylindrical forward portion, the cylindrical rear portion of the outer collar being removably received in the seat around the melt bore and the cylindrical forward portion of the outer collar being received in a circular opening in the mold, whereby the outer collar bridges the insulative air space extending between the nozzle and the mold, the central opening through the outer collar aligns with the melt bore through the nozzle, and the forward tip of the central shaft of the torpedo extends in alignment with the gate, the elongated central shaft of the torpedo having a highly heat conductive metal inner portion and an integral wear resistant outer portion, the improvement wherein;

the torpedo has a small diameter bore extending radially inward through the collar and the blade to an inner end in the highly heat conductive portion of the central shaft to replaceably receive a thermocouple element extending radially inward therein, the thermocouple element having an inner end accurately located in the highly heat conductive portion of the central shaft to monitor the operating temperature of the melt, the radial bore being positioned longitudinally whereby the thermocouple element extends radially outward therefrom into the insulative air space forwardly of the forward end of the nozzle and then bends rearwardly to extend in the insulative air space along the outer surface of the nozzle, whereby receipt of the thermocouple element in the radially extending bore allows for ease of replacement of the thermocouple element.

2. Injection molding apparatus as claimed in claim 1 wherein the rear portion of the outer collar of the torpedo has a threaded outer surface, the seat around the melt bore at the forward end of the nozzle has a matching threaded inner surface, and the outer collar of the torpedo has an engageable intermediate portion extending into the insulative air space between the forward end of the nozzle and the mold to securely attach the torpedo to the nozzle by screwing the rear portion of the outer collar of the torpedo into the seat around the melt bore at the forward end of the nozzle.

3. Injection molding apparatus as claimed in claim 2 wherein the engageable intermediate portion of the outer collar of the torpedo has an outer surface with a plurality of flat faces.

4. Injection molding apparatus as claimed in claim 3 wherein the torpedo has a pair of spiral blades extending between the central shaft and the outer collar to impart a swirling motion to the melt flowing between them to the gate.

5. Injection molding apparatus as claimed in claim 4 wherein the gate extends through the mold from a central forward portion of the well to a cavity, and the forward portion of the outer collar of the torpedo is received in a circular seat in the mold extending around the forward portion of the well.

6. Injection molding apparatus as claimed in claim 4 wherein an opening extends centrally through the mold from the well to a cavity, the forward portion of the outer collar of the torpedo extends through the central opening to the cavity, and the central opening through the outer collar of the torpedo tapers inwardly in the forward portion to form the gate.

* * * * *